United States Patent Office 2,805,572
Patented Sept. 10, 1957

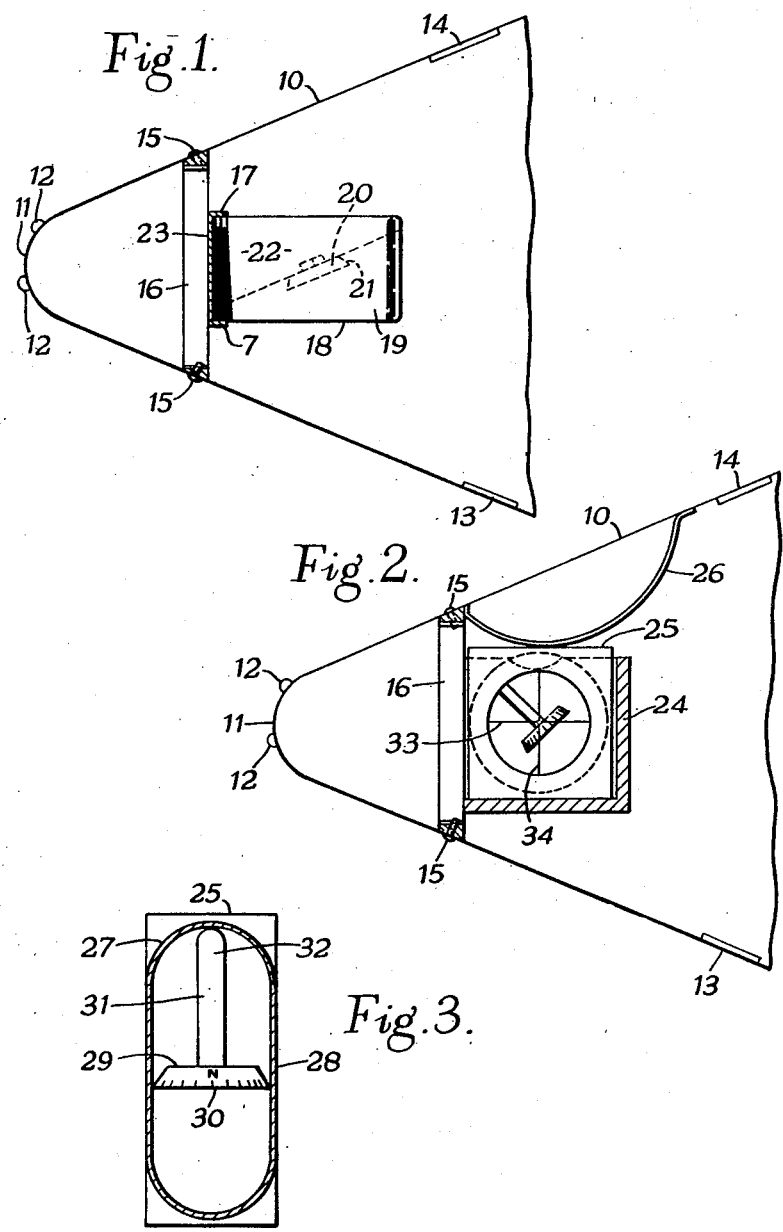

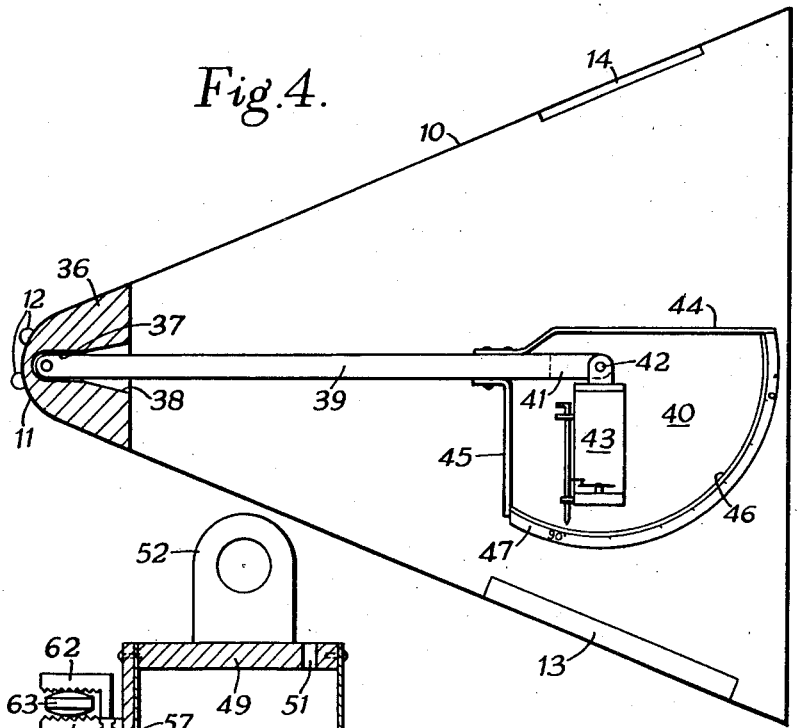
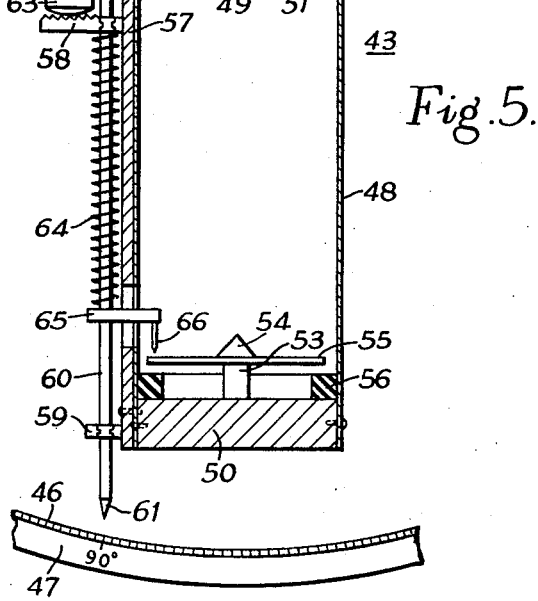

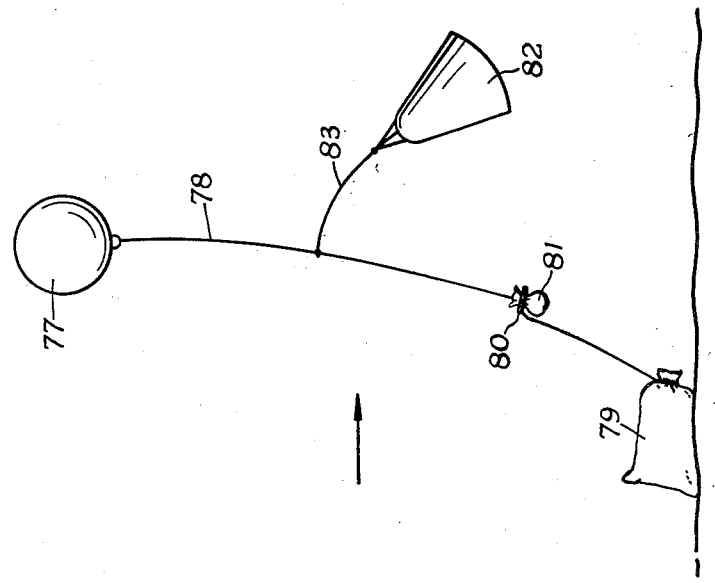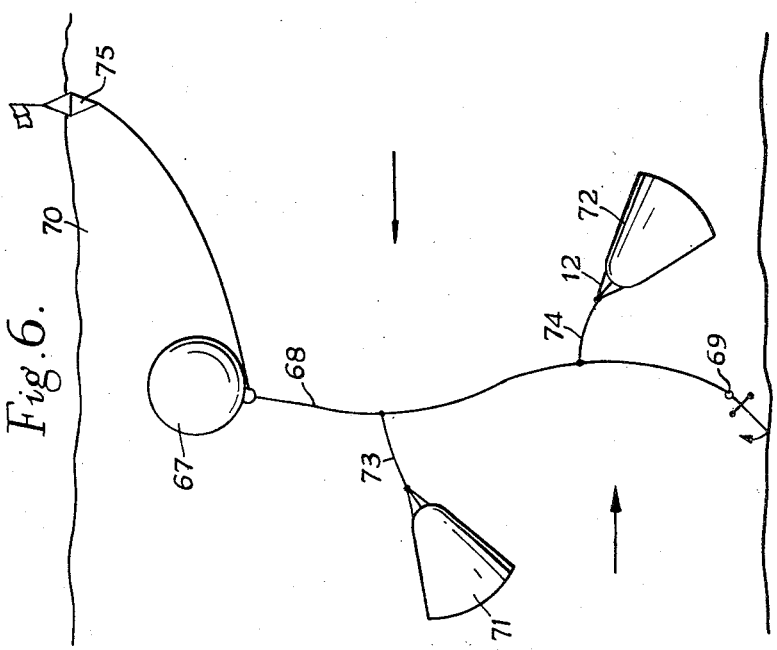

2,805,572

FLUID CURRENT INDICATORS

James Norman Carruthers, London, England, assignor to Kelvin & Hughes Limited, Hillington, Glasgow, Scotland Application March 12, 1954, Serial No. 415,891

Claims priority, application Great Britain March 20, 1953

6 Claims. (Cl. 73—189)

The present invention relates to fluid current indicators. There exists and has long existed a need for some simple device by the use of which numerous observations of momentary currents in the sea could be easily and cheaply made in respect both of speed and direction at places where the current's speed and direction might be very different at depth from its speed and direction at the surface. In such a device a prime desideratum is to avoid the necessity of anchoring a ship. It is of course possible to make observations of deep water currents from a properly equipped research vessel which can apply various expensive current meters to the task, but even then reliable results are not easily obtained and it is very costly to immobilise a specialist ship which would usually require to be anchored; moreover to depend upon a research vessel would inevitably mean considerable restriction of the coverage in time and space.

In accordance with the present invention a fluid current indicator comprises a member adapted to stream in the current and carrying means movably susceptible for a pre-determined period to gravity and to the earth's magnetic field, which means is adapted to be fixed relative to the said member when that period has elapsed and so cause or enable it to indicate the direction and inferentially the speed of the current during said period or part thereof. Said means may comprise a compass element and tiltable means carrying the compass element, which tiltable means can tilt in relation to said member so as to remain at a predetermined angle to the vertical while said member moves to an unpredetermined angle by the current. The said member (or captive member as it will be attached to some form of anchorage during use) may be a hollow member such as a cone open at its large end and secured at its apex to a mooring line attached at one end to a weight and at the other to a buoy. The means susceptible to magnetism may be a compass element, e. g. a compass card, which is either itself pendulous or mounted in a pendulous carrier. Means for holding the compass card fixed after a predetermined time may comprise:

(a) A material which is for that period liquid and in which the compass card can then float but which congeals or solidifies thereafter; or (b) A positive or frictional locking device which grips the compass card by the pressure of a spring released after that time, e. g. by the solution in the ambient liquid of a soluble pellet by which the spring is until then constrained. Where the compass is mounted in a pendulous carrier the release of the spring just referred to may effect positive locking of the carrier e. g. by engagement of a pointed plunger in a foraminous track.

The present invention has important applications in large scale commercial fishing which depends for its success upon knowledge of water movement well below the surface. It is a requirement in this industry that any apparatus should be simple and robust and capable of providing information required in a form in which a fisherman can appreciate and use it. The information here in question is the direction and speed of water movement at those depths where attractive concentrations of fish have already been located, e. g. by supersonic means, so that the fisherman can operate his nets without tangling up and the fish be approached from the correct direction to ensure frightening them into and not away from the net. No wise assumption can be made of current flow at depth from observations carried out near the surface. The current indicator of the present invention records momentary water current movement, and this is what the fisherman requires to know. The device can be thrown from a ship and recovered within half an hour providing the required information; or it can be thrown from a ship and left to release itself after any desired interval to be recovered either deliberately or later on by chance finding, the recorded information being then communicated to the person requiring it.

In order that the present invention may be more fully understood and carried into effect three embodiments thereof together with methods of their use will now be described by way of example with reference to the accompanying drawings in which:

Figure 1 is a diagrammatic longitudinal cross-section of one form of current indicator;

Figure 2 is a similar view of a second form;

Figure 3 is a detailed view of the compass unit in its case as shown in Figure 2;

Figure 4 is a diagrammatic longitudinal sectional view of a third form of current indicator;

Figure 5 is a detailed view of the pendulous element shown in Figure 4;

Figure 6 shows diagrammatically the use of a submarine current indicator in accordance with the invention for recovery by ship a short time after laying; and Figure 7 shows the manner of its use in deep water for recovery by chance or on stranding.

All three types of submarine current indicator illustrated in the drawings comprise an open ended cone 10 formed with a rounded nose 11 and made of light metal or other non-magnetic substance which is unaffected by immersion in sea water. The nose 11 carries anchorage means in the form of three external eyes or lugs 12; all other fittings and mechanisms of the device are mounted inside the cone 10. When the cone 10 is anchored in the water it constitutes an orientatable captive member which streams in the current. Near the open end of the cone may be provided at the bottom a fixing 13 for ballast which could if required be in the form of a depth indicator, and at the top a fixing 14 for a plastic covered questionnaire paper this being of particular value when the device is to be recovered by chance or on stranding. All the equipment described above and hereinafter save the compass is required to be of non-magnetic material.

Referring to Figure 1 the nose 11 of the cone 10 is detachable being secured to the main body of the cone 10 by bolts or screws 15. To the bulkhead 16 is fixed the screwtop 17 of a transparent jar 18 which may be made of the material sold under the registered trademark "Pyrex." When fitted for use the Pyrex jar 18 is filled half with hot jelly crystal solution 19 on which floats a magnetic compass 20 having a ring type card 21, and half with petroleum 22. A rubber ring 23 between the jar 18 and the top 17 effects a fluid type joint. The submarine current indicator shown in Figure 1 is in operation drawn down to a desired depth as indicated in Figure 6. The compass card is thus movably susceptible to the action of gravity and to the earth's magnetism while the jelly is liquid. The jelly solution 19 cools and solidifies by the time the indicator has taken its final current indicating position, thereby preventing the compass from further free rotation. When the device is recovered, the direction of the sea current at the time the jelly solution solidifies as is shown by the compass card indication nearest to the mouth of the jar. The current velocity can be obtained by calibration and inference from the angle which the jelly surface makes with the axis of the jar 18. The petroleum 22 is used to inhibit bacterial growth in cases where the indicator is not recovered immediately and also so that the jar 18 being filled with liquid is not liable to implosion.

Referring now to Figures 2 and 3 here again the nose 11 of the cone 10 is detachable being secured to the body of the cone by bolts or screws 15. To the bulkhead 16 is attached an open topped box or rack 24 which serves to carry the compass unit 25. Attached to the inner upper surface of the cone 10 is a curved spring or stop 26 serving to prevent the compass unit 25 from becoming dislodged from the rack 24. The compass unit 25 comprises a hollow toroidal metallic body 27 formed at one side with a circular transparent window 28 e. g. of a transparent plastic such as methyl methacrylate or of any other appropriate transparent synthetic resin sheet material. Body 27 is filled with hot jelly solution either through window 28, which can be unscrewed for the purpose, or through a screw filling cap not shown provided at a convenient position. Within body 27 are a magnetic compass 29 and ring type card 30 which are kept central within the body by means of a tubular air filled float 31 mounted vertically at one end and above the center of the compass. The upper end 32 of float 31 bears against the vaulted inner surface of body 27 and may as shown be pointed to reduce friction. The unit 25 comprises an open sided rectangular case which fits into box 24 and is maintained in place by spring 26. Two cross-lines 33, 34 mounted at right angles to each other are provided to enable the tilt and direction of the compass card 30 to be read. The operation of the device shown in Figures 2 and 3 is similar to that of the device shown in Figure 1 but the current velocity is obtained by calibration and inference from the angle between compass card 30 and the cross lines 33, 34.

Referring now to Figures 4 and 5 of the drawings these show a construction of submarine current indicator particularly suitable for use at a great depth. In this construction the nose 11 is integral with the body portion of cone 10. Within nose 11 is formed a solid or sheet metal anchorage 36 slotted at 37 and belled at 38 to receive a bar 39 carrying the recording unit 40. Bar 39 and member 36 are formed with holes which coincide when bar 39 is in operative position and through which a locking pin not shown may be passed through the cone nose 11 and suitably secured therein. The other end 41 of bar 39 is forked and carries a spindle 42 on which is pendulously mounted the gravity responsive member 43 of unit 40. Adjacent spindle 42 are upper and lower supports 44, 45 between which is mounted an arcuate strip 46 of metal gauze whose center is coincident with the axis of spindle 42. A scale 47 mounted along the edge of strip 46 is graduated in degrees from 0 degrees (horizontal) to 90 degrees (vertical). The pendulous member 43 comprises a hollow plastic cylinder 48 attached to upper and lower brass endplates 49, 50. Endplate 49 is provided with an air vent 51 and has attached thereto the lug 52 by which it is pendulously mounted on spindle 42. The lower endplate 50 is detachably secured to the cylinder 48 and being heavier than endplate 49 serves as the main weight of the pendulous body. On the upper surface of endplate 50 is formed a pivot 53 on which is rotatably mounted a magnetic compass 54 carrying a disc type compass card 55. Immediately below the card 55 is mounted a ring 56 of rubber or wax the purpose of which is to support the card when as hereinafter described it is clamped. At one side of cylinder 48 is secured a metal strip 57 extending from top to bottom and provided with upper and lower guides 58, 59 in which can slide a rod 60 formed at its lower end with a locking device or stylus point 61 and at its upper end with an arm 62 which co-operates with part of guide 58 to grip a soluble tablet 63 which is firmly held between teeth on members 58 and 62 which are urged towards each other by a compression spring 64 carried on rod 60 which is provided with an arm 65 which projects within cylinder 48 and has a downwardly directed locking device or pin 66. When the device is set for use the parts thereof occupy the positions shown in Figure 5 in which the soluble tablet 63 prevents spring 64 from causing pin 66 to engage and grip the compass card 55 and from causing the stylus point 61 from entering and engaging a perforation in the metal gauze track 46. The device shown in Figure 4 is in operation sent down to the desired depth in the sea and when tablet 63 dissolves spring 64 causes engagement between pin 66 and card 55 and also between point 61 and the track 46. The angular positions of compass card 55 and pendulous body 43 in relation to the members supporting them provide information from which can be read or inferred the direction and velocity of the water current in which the device is immersed when tablet 63 dissolves.

The methods of use of the indicators above described are diagrammatically shown in Figures 6 and 7. Where recovery by ship is intended, normally a short time after laying the device, the arrangement shown in Figure 6 is used. Here a buoy 67 is moored by a rope 68 attached at its lower end to an anchor or other suitable weight 69 so that the buoy 67 floats below the surface 70 of the sea. Submarine current indicators such as 71 and 72 are secured in any desired numbers to the mooring rope 68 by short stray lines 73, 74 attached to the eyes 12 of the indicator nose. A float 75 and flag is made fast to buoy 67 by a stray line 76 to assist in quick recovery of the device.

Where a current observation is required near the sea bed in deep water the arrangement shown in Figure 7 is preferred. Here a buoy 77 is moored by a short line 78 to a sack 79 containing gravel or stones through the intermediary of the well-known arrangement of ring 80 and a water permeable sugar bag 81. The indicator 82 is secured by a stray line 83 to mooring rope 78. When the sugar in bag 81 is dissolved buoy 77 pulls the bag through ring 80 and the buoy 77 and indicator 82 drift away to be recovered at the surface or on stranding. It is in this case particularly of value to provide the arrangement already mentioned of a fixing 14 to carry a plastic envelope containing instructions for the finder.

When the indicator is used by a fisherman it will be held captive and normally be retrieved after the 20 minutes or so during which it is left in the sea. A suitable concrete weight or sack of stones can be used as an anchor so that a lighter line may be used bent to it than it would be possible if a conventional anchor which hooked into the sea floor required to be lifted each time. The line used should be of length less than the depth of the water; at a point some little distance short of the surface there is attached a buoy of good lift to secure that the line shall be as vertical as possible. In use the anchoring means is simply lowered overboard and the submarine current indicator snooded on a height above bottom where fish have been found. The whole assembly is then let go and the ship or boat returns to retrieve it in a short time of the order 20 to 30 minutes. To secure this time it is found that known hydrogen generating pellets are very effective when used as the soluble tablet 63 shown in Figure 5.

The method of operation described with reference to Figure 7 of the drawings will be found valuable for research purposes in waters such as estuaries and fiords. In quiet waters it will be possible to retrieve the buoys and indicators and it will consequently be possible to use large numbers. If observations at various depths are to be made on one line then the buoy will need to possess adequate lift and the anchor to be sufficiently heavy. A 20 minute interval before solution of the tablet 63 will normally be found suitable when using the indicator in this way.

When using the indicators non-captive at great depth in the open ocean it is likely to be but rarely possible to retrieve the instrument immediately after it has risen to the surface after recording. Release timing becomes slightly more difficult and instead of a 20 minute soluble pellet some long-lasting soluble material such as an aniseed ball may be used. Instead of the sugar bag arrangement described with reference to Figure 7 a small bag containing dried peas may be used which after long soaking go "mashy" and pull through the ring.

Calibration of the device for inferring speed of current is easily effected by towing a sample submarine current indicator at varying speeds through still water and noting for each speed the angle of inclination of the device.

I claim:

1. A fluid current indicator comprising a hollow body member, means to maintain said body member submerged in a fluid current the velocity and direction of flow of which are to be determined comprising a flexible means connected between one end of the body member and a submerged anchorage device and acting to tether said member whereby said body member will be oriented in accordance with both direction and velocity of current flow, said body member being free to move under the action of current flow, means carried by said body member and movable under the action of gravity, said means comprising direction indicating means, speed indicating means and means to fix indicated values of direction and speed.

2. The combination set forth in claim 1, said means carried by said body member comprising a jelly which remains fluid for a period of time and then solidifies said jelly comprising a crystal solution which is initially hot and solidifies as it cools in the fluid current in which the body member is immersed, said direction indicating means comprising a compass element movably supported by said jelly solution in its hot condition and supported in a fixed position in the cold condition of said solution, said means carried by said body member comprising an inner container within said body member and containing said jelly solution, the angle said solidified jelly makes with a wall of said container providing an indication of current speed.

3. The combination set forth in claim 1, said means comprising a second body member within said hollow body member and fixed with respect thereto, a jelly within said second body member which remains fluid for a period of time and then solidifies, a window having crosshairs in a wall of said second body member and direction indicating means supported by said fluid.

4. The combination set forth in claim 3, said direction indicating means comprising a magnetic compass, a ring type card and a tubular gas filled float mounted vertically at one end and above the center of the compass said second body member having a vaulted inner surface against which the upper end of said tubular float bears.

5. A fluid current indicator comprising a hollow body member, means to maintain said body member submerged in a fluid current the velocity and direction of flow of which are to be determined, said means including a flexible means connected between one end of the body member and a submerged anchorage device and acting to tether said member whereby said body member will be oriented in accordance with both direction and velocity of current flow, indicating means carried by said body and responsive to the orientation of said body, and means operable after a predeterminable period of time to hold said indicating means in its indicating position.

6. The combination set forth in claim 5, said indicating means comprising a solution which remains fluid for a period of time and then solidifies, said direction indicating means comprising a compass element movably supported by said solution in its fluid condition and supported in a fixed position after said solution solidifies, and a container for said solution, the angle said solution makes with a surface of said container providing an indication of current speed.

References Cited in the file of this patent

UNITED STATES PATENTS

| | | |
|---|---|---|
| 597,572 | Burdett | Jan. 18, 1898 |
| 1,059,851 | Elia | Apr. 22, 1913 |
| 1,954,115 | Allen | Apr. 10, 1934 |
| 2,074,692 | Granville | Mar. 23, 1937 |
| 2,418,549 | Rugeris | Apr. 8, 1947 |
| 2,630,711 | Kahl | Mar. 10, 1953 |